US010263764B2

(12) United States Patent
Liaghati et al.

(10) Patent No.: US 10,263,764 B2
(45) Date of Patent: Apr. 16, 2019

(54) AUTO-ADAPTIVE DIGITAL CLOCK SYSTEM AND METHOD FOR OPTIMIZING DATA COMMUNICATIONS

(71) Applicant: The Boeing Company, Chicago, IL (US)

(72) Inventors: Amir L. Liaghati, Madison, AL (US);
Mahsa L. Liaghati, Madison, AL (US);
Chen Jye Chang, Madison, AL (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 15/145,503

(22) Filed: May 3, 2016

(65) Prior Publication Data

US 2017/0324537 A1    Nov. 9, 2017

(51) Int. Cl.
*H04L 7/00* (2006.01)
*H04L 29/08* (2006.01)
*H04Q 9/00* (2006.01)
*H04L 1/00* (2006.01)

(52) U.S. Cl.
CPC .......... *H04L 7/0037* (2013.01); *H04L 1/0006* (2013.01); *H04L 67/12* (2013.01); *H04Q 9/00* (2013.01)

(58) Field of Classification Search
None
See application file for complete search history.

(56) References Cited

U.S. PATENT DOCUMENTS

| 6,400,683 B1* | 6/2002 | Jay ........................ H04J 3/0632 370/229 |
| 2004/0213291 A1* | 10/2004 | Beshai ................... H04L 47/10 370/473 |
| 2010/0042866 A1* | 2/2010 | Shih ......................... G06F 1/12 713/600 |
| 2011/0260837 A1* | 10/2011 | Finkezeller ...... G06K 19/07749 340/10.1 |

(Continued)

OTHER PUBLICATIONS

European Patent Office; Extended European Search Report for European Patent Application No. 17152722.9 dated Aug. 21, 2017, 8 Pages.

(Continued)

*Primary Examiner* — Mohammad S Adhami
(74) *Attorney, Agent, or Firm* — Charles L. Moore; Moore & Van Allen PLLC

(57) ABSTRACT

A method for optimizing data communications includes receiving a plurality of data and comparing a size of the plurality of data to a preset fixed data packet size. The method also includes transmitting the plurality of data within the preset fixed data packet size in response to the size of the plurality of data corresponding to the preset fixed data packet size. The method additionally include dynamically, autonomously adjusting a clock frequency for formatting data packets to format one or more data packets that accommodate the size of the plurality of data with minimal fill data in response to the size of the plurality of data being different from the preset fixed data packet size. The method further includes formatting the one or more data packets in response to dynamically, autonomously adjusting the clock frequency.

20 Claims, 5 Drawing Sheets

(56) References Cited

U.S. PATENT DOCUMENTS

2013/0343750 A1* 12/2013 Lanzone ............... H04L 1/0009
398/34

OTHER PUBLICATIONS

CCSDS, The Consultative Committee for Space Data Systems; "Recommendation for Space Data System Standards, Recommended Standard for Encapsulation Service," CCSDS 133.1-B-2, Blue Book Oct. 2009, 37 pages.

Liaghati, Amir, et al.; "A Novel Scheme for Telemetry System Data Rate Optimization," IEEE, 2016, 7 pages.

* cited by examiner

AUTO-ADAPTIVE DIGITAL CLOCK SYSTEM AND METHOD FOR OPTIMIZING DATA COMMUNICATIONS

This invention was made with Government support under NNM07AB03C awarded by the National Aeronautics and Space Administration (NASA). The Government has certain rights in this invention.

FIELD

The present disclosure relates to data communications, and more particularly to an auto-adaptive digital clock system and method for optimizing data communications.

BACKGROUND

Some communications systems are designed to transmit data packets that have a preset fixed data packet size or predefined number of bits or bytes in each data packet transmitted. An example of a data communications system that has a preset fixed data packet size is a communications system that uses the Consultative Committee for Space Data System (CCSDS) standard which specifies a fixed size, packetized telemetry protocol scheme. Many National Aeronautics and Space Administration (NASA) space programs use the CCSDS standard for the downlink of telemetry data to ground stations. In fixed data packet systems, when there is not enough data to completely fill the preset fixed data packet size, fill data or idle data is added to the fixed data packet. When there is slightly more data than the size of a single fixed data packet, at least two data packets need to be transmitted with the second or last data packet containing fill data or idle data. The fill data or idle data is not used other than to occupy space in the data packet and is overhead taking up bandwidth when transmitted resulting in inefficient use of available communications bandwidth and resources.

SUMMARY

In accordance with an embodiment, a method for optimizing data communications includes receiving, by a processing device, a plurality of data and comparing, by the processing device, a size of the plurality of data to a preset fixed data packet size. The method also includes transmitting, by the processing device, the plurality of data within the preset fixed data packet size in response to the size of the plurality of data corresponding to the preset fixed data packet size. The method additionally includes dynamically, autonomously adjusting, by the processing device, a clock frequency for formatting data packets to format one or more data packets that accommodate the size of the plurality of data with minimal fill data in response to the size of the plurality of data being different from the preset fixed data packet size. The method further including formatting, by the processing device, the one or more data packets in response to dynamically, autonomously adjusting the clock frequency.

In accordance with another embodiment, a method for optimizing data communications includes receiving, by a processing device, a plurality of data and determining, by the processing device, whether the plurality of data has reached or exceeded a predefined threshold value below a preset fixed data packet size. The method also includes transmitting, by the processing device, the plurality of data formatted according to the preset fixed data packet size in response to the plurality of data reaching or exceeding the predefined threshold value. The method additionally includes dynamically, autonomously adjusting, by the processing device, a clock frequency to receive additional data in response to the plurality of data being less than the predefined threshold value. The method additionally includes receiving, by the processing device, additional data until the plurality of data and the received additional data reach or exceed the predefined threshold value. The method further includes transmitting, by the processing device, the plurality of data and the received additional data formatted in the preset fixed data packet size in response to the plurality of data and the received additional data reaching or exceeding the predefined threshold value.

In accordance with a further embodiment, a system for optimizing data communications includes a processing device and an auto-adaptive digital clock system operating on the processing device. The auto-adaptive digital clock system is configured to perform a set of functions including receiving a plurality of data and comparing a size of the plurality of data to a preset fixed data packet size. The set of functions also includes transmitting the plurality of data within the preset fixed data packet size in response to the size of the plurality of data corresponding to the preset fixed data packet size. The set of functions additionally includes dynamically, autonomously adjusting a clock frequency for formatting data packets to format one or more data packets that accommodate the size of the plurality of data with minimal fill data in response to the size of the plurality of data being different from the preset fixed data packet size. The set of functions further include formatting the one or more data packets in response to dynamically, autonomously adjusting the clock frequency.

In accordance with a further embodiment, a computer program product for optimizing data communications includes a computer readable storage medium having program instructions embodied therewith. The computer readable storage medium is not a transitory medium per se. The program instructions are executable by a device to cause the device to perform a method including receiving a plurality of data and determining whether the plurality of data has reached a predefined threshold value within a preset fixed data packet size. The method also includes transmitting the plurality of data within the preset fixed data packet size in response to the plurality of data reaching or exceeding the predefined threshold value. The method additionally includes dynamically, autonomously adjusting a clock frequency to receive additional data in response to the plurality of data being less than the predefined threshold value. The method also includes receiving additional data until the plurality of data and the received additional data reach or exceed the predefined threshold value. The method further includes transmitting the plurality of data and the received additional data formatted in the preset fixed data packet size in response to the plurality of data and the received additional data reaching or exceeding the predefined threshold value.

In accordance with another embodiment or any of the previous embodiments, transmitting the plurality of data within the preset fixed data packet size may include transmitting the plurality of data within the preset fixed data packet size in response to the size of the plurality of data being greater than a predefined threshold value and less than the preset fixed data packet size.

In accordance with another embodiment or any of the previous embodiments, dynamically, autonomously adjusting the clock frequency for formatting data packets may include decreasing the clock frequency from a standard clock frequency for the preset fixed data packet size in response to the size of the plurality of data being less than the preset fixed data packet size, the decreased clock frequency allowing additional received data to be added with the plurality of data to provide the preset fixed data packet size.

In accordance with another embodiment or any of the previous embodiments, wherein dynamically, autonomously adjusting the clock frequency for formatting data packets may include dynamically, autonomously adjusting the clock frequency from a standard clock frequency for formatting the preset fixed data packet size that provides for formatting and transmitting a plurality of preset fixed data packets with only one of the plurality of preset fixed data packets containing a minimal amount of fill data in response to the plurality of data being greater than the preset fixed data packet size.

In accordance with another embodiment or any of the previous embodiments, comparing a size of the plurality of data to a preset fixed data packet size may include determining a number of bits received in the plurality of data.

In accordance with another embodiment or any of the previous embodiments, formatting the one or more data packets may include formatting the one or more data packets in the preset fixed data packet size with a minimal amount of fill data.

The features, functions, and advantages that have been discussed can be achieved independently in various embodiments or may be combined in yet other embodiments further details of which can be seen with reference to the following description and drawings.

DETAILED DESCRIPTION

Figure 1:
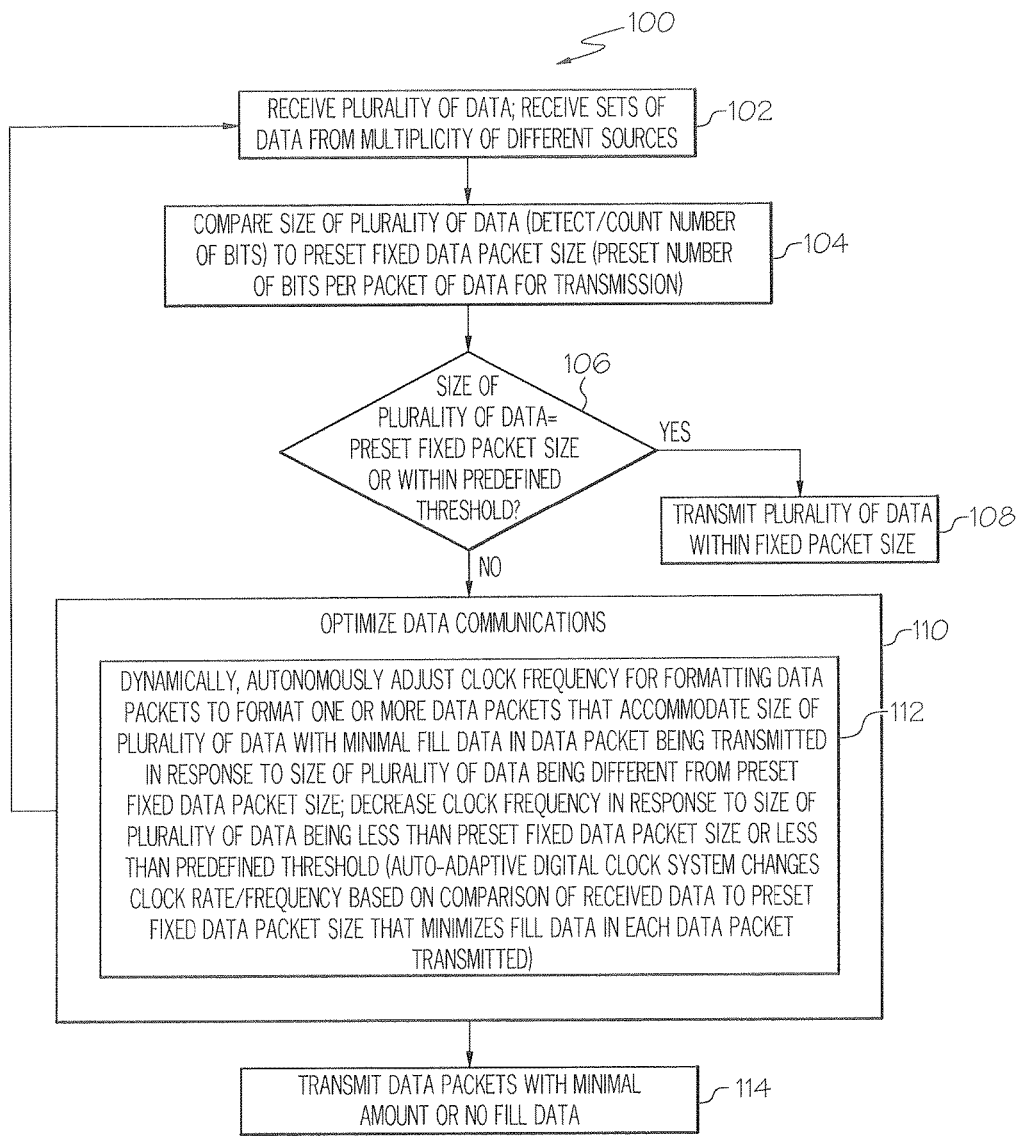
FIG. 1 is a flow chart of an example of a method for optimizing data communications in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a flow chart of an example of a method 100 for optimizing data communications in accordance with an embodiment of the present disclosure. The method 100 may be used in a communications system that transmits data in preset fixed data packets or data packets that have a preset fixed number of bits in each packet of data that is transmitted between communications devices within the communications system. Any unused or unoccupied bandwidth in the preset fixed data packet is filled or occupied by fill data or idle data comprising bits that do not represent any actual data or information that is useful or used by a receiving device. The fill data or idle data simply occupies bit places to complete the preset fixed data packet. Accordingly, communications bandwidth may be occupied by fill data that does not carry any actual information or information that is not used by the receiver. This results in inefficient use of the bandwidth or the communications channel. An example of such a system, that uses preset fixed data packets, is a telemetry system for transmitting data from a spacecraft to a ground station which will be described in more detail with reference to FIG. 3. As described in more detail herein embodiments of the present disclosure more efficiently use the bandwidth and available resources by dynamically, autonomously changing a data frequency or rate to expand a window or time frame for receiving more actual data. The additional actual data received is used to fill the preset fixed data packet size rather than fill data. The preset fixed data packet size may also define a channel access data unit frame. The method 100 may also be embodied in a computer program product.

In block 102, a plurality of data is received. The plurality of data may include a plurality of sets of data received from a multiplicity of different sources. In block 104, a size of the plurality of data is compared to a preset fixed data packet size. A number of bits of the plurality of data may be detected or counted and compared to a number of bits that form the preset fixed data packet. The number of bits of the plurality of data may be counted or detected as the plurality of data is received or after the plurality of data has been received.

In block 106, a determination may be made whether a size or number of bits of the plurality of data received equals the preset fixed packet size or number of bits. If the size of the plurality of data received equals the preset fixed packet size, the method 100 advances to block 108. In block 108, the plurality of data is transmitted within the preset fixed packet size. If the size of the plurality of data is different from the preset fixed packet size in block 106, the method 100 advances to block 110.

In another embodiment, a determination may be made in block 106 whether the size of the plurality of data received is greater than a predefined threshold value and less than the preset fixed data packet size. If the size of the plurality of data equals or exceeds the predefined threshold value and is less than the preset fixed data packet size, the method 100 may advance to block 108 and the plurality of data may be transmitted within the preset fixed data packet size. Any fill data to make up any difference between the predefined threshold value and the preset fixed data packet size is appended or added to the plurality of data in the data packet to complete the preset fixed data packet size. The predefined threshold value is set to a value that minimizes an amount of fill data. If the size of the plurality of data is less than the predefined threshold value in block 106, the method 100 may advance to block 110.

In block 110, data communications are optimized based on the comparison of the size of the plurality of data to the preset data packet size. In block 112, data communications are optimized by dynamically, autonomously adjusting a clock frequency for formatting data packets in response to the size of the plurality of data being different from the preset fixed data packet size. The clock frequency or rate is dynamically, autonomously adjusted to format one or more data packets with the preset fixed data packet size that accommodate the size of the plurality of data with minimal fill data in the fixed data packets being transmitted. Dynamically, autonomously adjusting the clock frequency for formatting data packets avoids transmitting a plurality of preset fixed data packets with at least one preset fixed data packet containing more than a predetermined amount of fill data in response to the plurality of data being greater than the preset fixed data packet size. An example of a system for dynamically, autonomously adjusting the clock frequency or rate to expand a time period or window for forming a data packet with preset fixed data packet size will be described with reference to FIG. 3.

Dynamically, autonomously adjusting the clock frequency for formatting data packets includes decreasing the clock frequency from a standard clock frequency for the preset fixed data packet size in response to the size of the plurality of data being less than the preset fixed data packet size or less than a predefined threshold value within the preset fixed data packet size. The decreased clock frequency allows additional received data to be added with or appended to the plurality of data to provide the preset fixed data packet size.

Dynamically, autonomously adjusting the clock frequency for formatting data packets may also include adjusting the clock frequency from the standard clock frequency, for formatting the preset fixed data packet size, that provides for formatting and transmitting a plurality of preset fixed data packets with only one preset fixed data packet containing a minimal amount of fill data, in response to the plurality of data being greater than the preset fixed data packet size.

An auto-adaptive digital clock system may change the clock rate or frequency based on the comparison of the received data to the preset packet data size that minimizes the fill data in each data packet transmitted. The auto-adaptive digital clock system may change the clock rate or frequency to expand a time period or window to receive additional actual data to fill the preset fixed data packet rather than fill data or idle data.

In block 114, the data packet or packets may be transmitted with a minimal amount or no fill data.

Figure 2:
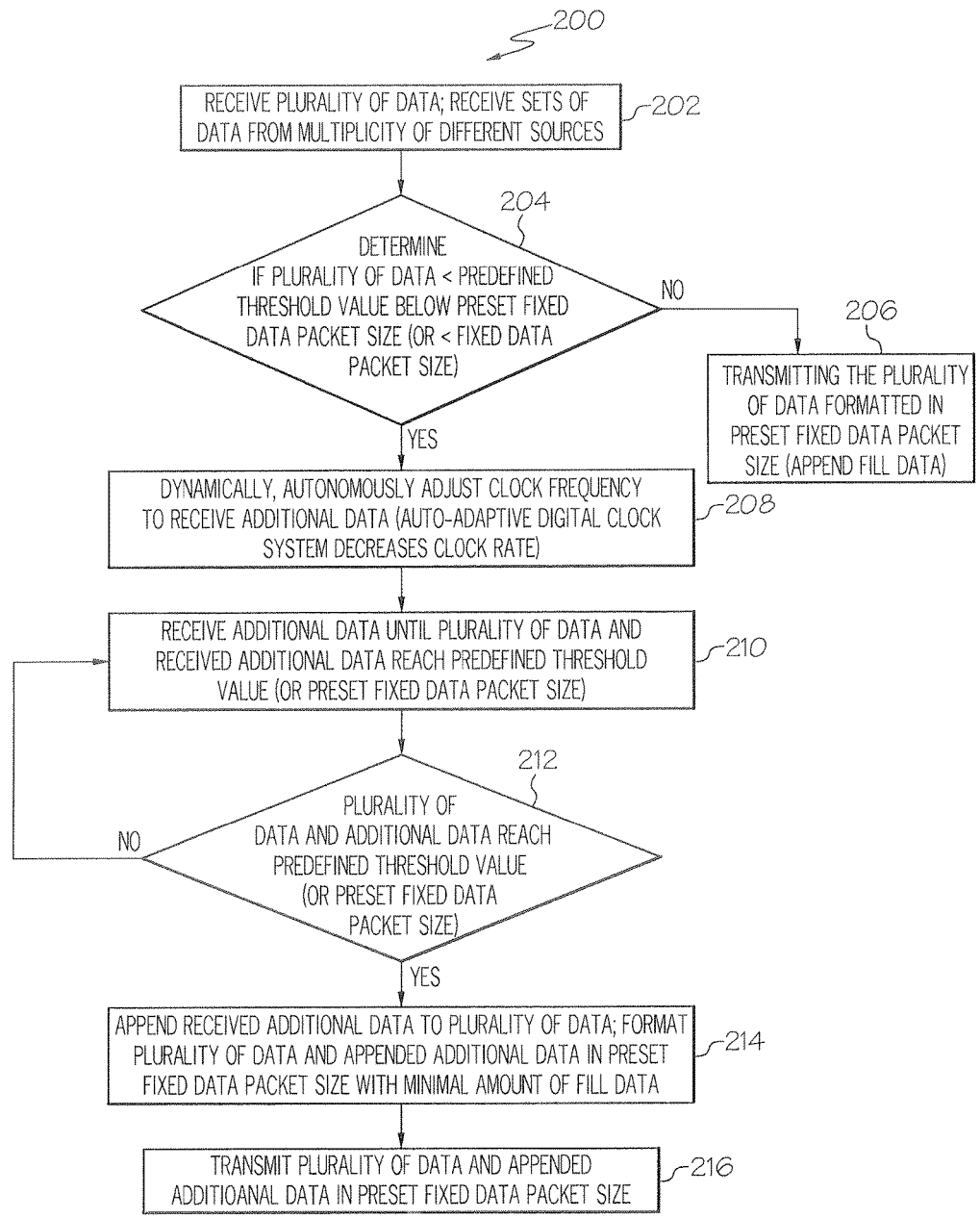
FIG. 2 is a flow chart of an example of a method for optimizing data communications in accordance with another embodiment of the present disclosure.

FIG. 2 is a flow chart of an example of a method 200 for optimizing data communications in accordance with another embodiment of the present disclosure. The method 200 may be used in a communications system that transmits data in preset fixed data packets or data packets that have a preset fixed number of bits in each packet of data that is transmitted between communications devices within the communications system. Any unused or unoccupied bandwidth in the preset fixed data packet is filled or occupied by fill data or bits that do not represent any actual data or information that is useful or used by a receiving device. The fill data simply occupies bit places to complete the preset fixed data packet. The method 200 may be embodied in a computer program product.

In block 202, a plurality of data may be received. The plurality of data may be sets of data received from a multiplicity of different sources.

In block 204, a determination may be made if a size of the plurality of data is less than a predefined threshold value below a preset fixed data packet size or whether the size of the plurality of data has reached or exceeded the predefined threshold value. In another embodiment, a determination may be made if the size of the plurality of data is less than the fixed data packet size. The determination whether the plurality of data has reached the predefined threshold value may include counting a number of bits of data being received and comparing the number of bits of data received to the predefined threshold value. Or in another embodiment comparing the number of bits of data received to the preset fixed data packet size.

If the plurality of data is not less than the predefined threshold value and has reached or exceed the predefined threshold value, the method 200 advance to block 206. In block 206, the plurality of data formatted according to the preset fixed data packet size is transmitted. A minimal amount of fill data corresponding to a difference between the size of the plurality of data and the preset fixed data packet size is appended to the plurality of data to provide a data packet with the preset fixed data packet size. The fill data will amount to a difference between the predefined threshold value or amount that the plurality of data exceeds the predefined threshold value and the preset fixed data packet size. The predefined threshold value is set or defined to minimize the amount of fill data.

If the plurality of data is less than the predefined threshold value in block 204, the method 200 advances to block 208. Or in another embodiment, if the plurality of data is less than the fixed data packet size, the method 200 advances to block 208. In block 208, a clock frequency is dynamically, autonomously adjusted to allow additional data to be received in response to the plurality of data being less than the predefined threshold value or less than the fixed data packet size. An auto-adaptive digital clock system may adjust the clock frequency or rate to allow additional data to be received. By adjusting the clock frequency or rate, a time period or time frame for forming the preset fixed data packet may be expanded or extended to receive the additional data to fill the preset fixed data packet size.

In block 210, additional data may be received until the plurality of data and the received additional data reach or exceed the predefined threshold value, or in the other embodiment, additional data may be received until the plurality of data and received additional data reach the preset fixed data packet size.

In block 212, a determination may be made if the plurality of data and received additional data have reached or exceeded the predefined threshold value, or in the other embodiment, if the plurality of data and received additional data have reached the preset fixed data packet size. If the plurality of data and received additional data have not reached the predefined threshold value or preset fixed data packet size, the method 200 may return to block 210 to received additional data. If the plurality of data and the received additional data have reached or exceeded the predefined threshold value or reached the preset fixed data packet size, the method 200 may advance to block 214.

In block 214, the received additional data may be appended to the plurality of data in response to the plurality of data and the received additional data reaching or exceeding the predefined threshold value, or in the other embodiment reaching the preset fixed data packet size. The plurality of data and the appended additional data may be formatted in the preset fixed data packet size with a minimal amount or no fill data.

In block 216, the plurality of data and the appended additional data in the preset fixed data packet size may be transmitted.

Figure 3:
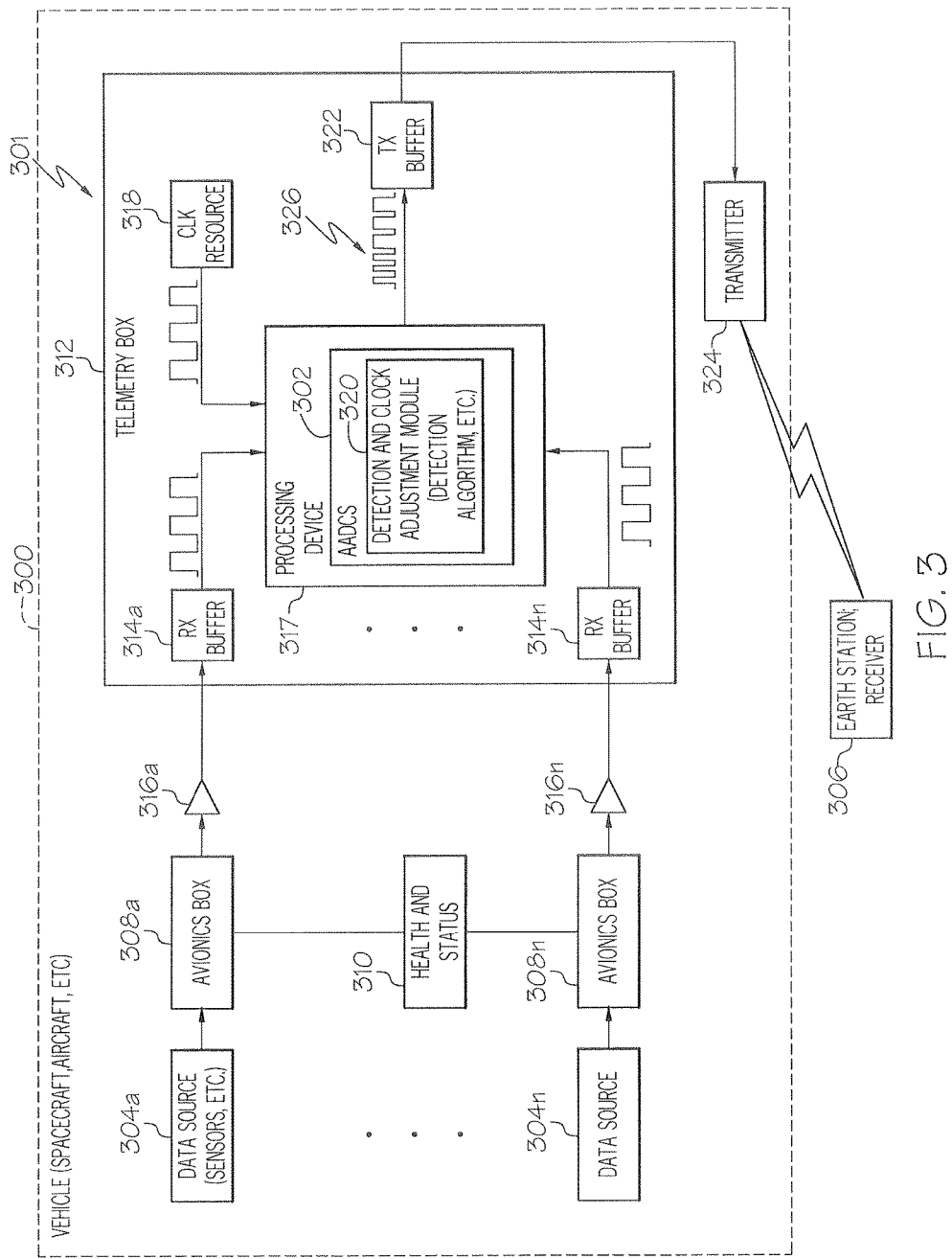
FIG. 3 is a block schematic diagram of a vehicle including an example of a system for optimizing data communications in accordance with an embodiment of the present disclosure.

FIG. 3 is a block schematic diagram a vehicle 300 including an example of a system 301 for optimizing data communications in accordance with an embodiment of the present disclosure. The vehicle 300 may be a spacecraft, aircraft or other vehicle or any equipment that may transmit data in a preset fixed data packet size similar to that described herein. The vehicle 300 may include a plurality of data sources 304a-304n. Examples of data sources 304a-304n may include but are not necessarily limited to sensors or other devices that may generate data, for example, telemetry data associated with the vehicle 300. The vehicle 300, which may be a spacecraft or aircraft may transmit the telemetry data to a receiver on the earth or an earth station 306. Examples of the data sensors may include but are not necessarily limited to sensors for determining or detecting different conditions, such as temperature, pressure, altitude, attitude, speed, or other conditions related to the vehicle 300. Examples of the data sources 304a-304n may also include one or more cameras for recording images or video that may be transmitted to the earth station 306.

Each data source 304a-304n may be coupled to one or more avionics box 308a-308n. Sensor signals from the sensors or data sources 304a-304n may be received by an associated avionics box 308a-308n. Each avionics box 308a-308n converts the analogy sensor signals received to digital signals by sampling the received analog signals. The digital signals may be formatted by the avionics boxes 308a-308n into frames and transmitted to a telemetry box 312. Health and status information 310 may be communicated between the avionics boxes 308a-308n.

Each avionics box 308a-308n may be coupled to a receive buffer 314a-314n of the telemetry box 312 by an amplifier 316a-316n. The telemetry box 312 is configured for generating and/or formatting the signals for transmission to the earth station 306. The telemetry box 312 may include a processing device 317 that is configured to add or combine the digital signals from each of the different data sources 304a-304n and to add any overhead data or information for transmission of the signals to the earth station 306. The processing device 317 may be configured to perform the method 100 of FIG. 1 and/or the method 200 of FIG. 2.

The telemetry box 312 is a state machine or similar device that repeatedly performs the same tasks during a preset time interval. For example, the telemetry box 312 may generate a channel access data unit (CADU) packet every 20 milliseconds (ms). Examples of different CADU data packets that may be formatted or generated by the telemetry box 312 will be described with reference to FIG. 4. The CADU data packet is a preset fixed data packet size that includes a preset number of bits or bytes. The telemetry box 312 includes a clock resource 318 for providing timing for generating and/or formatting each of the preset fixed data packets or CADU data packets.

The telemetry box 312 also includes the auto-adaptive digital clock system (AADCS) 302. The AADCS 302 is configured for optimizing data communications similar to that described herein and may also be configured for synchronous data communications. The method 100 of FIG. 1 and/or the method 200 of FIG. 2 may be embodied in and performed by the AADCS 302. The AADCS 302 may include a detection and clock adjustment module 320 or algorithm that detects or determines whether a plurality of data has reached or exceeded a predefined threshold value of the preset fixed data packet size and dynamically and autonomously adjusts or changes a clock frequency that accommodates the size of the plurality of data with minimal fill data. Accordingly, the AADCS 302 may be configured to detect a size of a plurality of data and determine whether the plurality of data is different from the preset fixed data packet size. The AADCS 302 may compare the size of the plurality of data to the preset fixed data packet size. The plurality of data is transmitted in response to the size of the plurality of data corresponding to the preset fixed data packet size. Alternatively, in another embodiment, the plurality of data is transmitted in response to the size of the plurality of data having reached or exceeded a predefined threshold value below the preset fixed data packet size.

If the size of the plurality of data is different from the preset fixed data packet size, a clock frequency or rate is dynamically, autonomously adjusted or changed by the AADCS 302 based on comparing the size of the plurality of data to the preset fixed data packet size to accommodate the size of the plurality of data with minimal or no fill data. For example, if the size of the plurality of data is less than the preset fixed data packet size, the clock frequency or rate may be dynamically and autonomously decreased or slowed by the AADCS 302 to allow additional actual data to be received from the data sources 304a-304n and added or combined with the plurality of previously received data from the data sources 304a-304n to provide or form a data packet with the preset fixed data packet size. The clock frequency or rate may be decreased or slowed from a standard or normal clock frequency or rate used for formatting or generating data packets having the preset fixed data packet size. An example of dynamically and autonomously adjusting or changing the clock frequency or rate will be described with reference to FIG. 5.

The clock frequency or rate is dynamically and autonomously adjusted or changed in that the AADCS 302 includes a mechanism to detect or count bits of data as the data is received from the data sources 304a-304n; compare the number of bits to the number of bits of the preset fixed data packet size; and automatically controls the clock frequency or rate for generating or formatting the data packets for transmission so that the data packets generated contain a minimal number or no fill data. Similar to that previously described, fill data is data or bits that occupy places or positions in a data packet to complete a preset fixe data packet size. The fill data is idle data that does not correspond to or carry any information that is used by a receiver.

In another embodiment, if the size of the plurality of data is less than a predefined threshold value below the preset fixed data packet size, the clock frequency or rate may be dynamically and autonomously decreased or slowed by the AADCS 302 to allow additional actual data to be received from the data sources 304a-304n and added or combined with the plurality of previously received data from the data sources 304a-304n to provide or form a data packet that has the preset fixed data packet size. The clock frequency or rate may be decreased or slowed from a standard or normal clock frequency or rate used for formatting or generating data packets having the preset fixed data packet size. Accordingly, a time interval or time period for forming data packets with the preset fixed data packet size may be extended from the normal or standard time interval or period.

If the size of the plurality of data is greater than the preset fixed data packet size, the clock frequency or rate may be dynamically and autonomously adjusted or changed by the AADCS 302 for forming and transmitting a plurality of data packets that each have a preset fixed data packet size and only one of the plurality of preset fixed data packets contains a minimal amount or no fill data.

The telemetry box 312 also includes a transmit buffer 322 that receives data packets from the AADCS 302. The transmit buffer 322 is coupled to a transmitter 324 for transmitting the data packets in the preset fixed data packets size with minimal or no fill data to the earth station 306.

Figure 4:
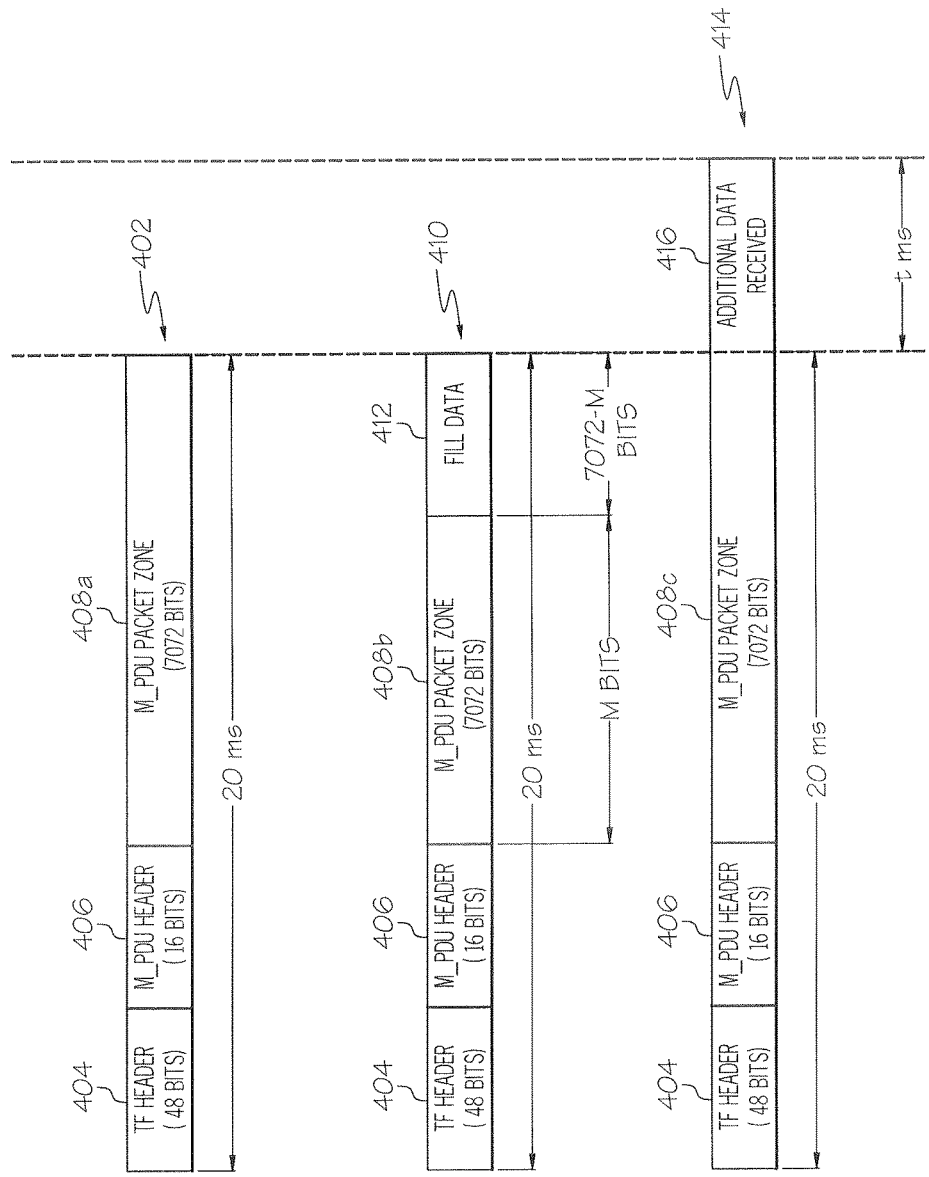
FIG. 4 is an illustration of examples of different data packets that may be generated by the telemetry box in FIG. 3.

Referring also to FIG. 4, FIG. 4 is an illustration of examples of different data packets that may generated by the telemetry box 312 in FIG. 3. In the examples illustrated in FIG. 4, the telemetry box 312 may format or generate a preset fixed data packet at 20 ms intervals. In other communications systems, the preset fixed data packets may be formed or generated at other time intervals. The data packet 402 in FIG. 4 corresponds to a data packet that is formed within the 20 ms time interval and has the preset fixed data packet size. Each data packet may include a header or Transfer Frame (TF) Header 404, a Multiplexing Protocol Data Unit (M_PDU) Header 406 and an M_PDU Packet Zone 408. The TF Header 404 may include information about the data packet 402. The M_PDU Header 406 may include information about the M_PDU Packet Zone 408. The M_PDU Packet Zone 408 includes data corresponding to information from the data sources 304a-304n. The data packet 402 is an example of a data packet where the data packets has the preset fixed data packet size. The preset fixed data packet size also corresponds to or defines a channel access data unit frame.

The data packet 410 is an example of a data packet where the plurality of data is different from the preset fixed data packet size. The data packet 410 has a plurality of data or number of bits that is less than the preset fixed data packet size or number of bits. Accordingly, fill data 412 would need to be added to the plurality of data of the data packet 410 to form or provide a data packet with the preset fixed data packet size. However, this may result in inefficient use of communication bandwidth. Accordingly, as described herein, the AADCS 302 may dynamically and autonomously adjust or change the clock frequency or rate to receive more actual data from the data sources 304a-304n until the preset fixed data packet size is reached or a threshold value of the preset fixed data packet size is reached. The data packet 414 illustrates the clock frequency or rate being slowed to allow more actual data from the data sources 304a-304n to be added to the data packet 414 rather than fill data to provide the preset fixed data packet size. Therefore, the time difference from the conventional time period (20 ms in the example of FIG. 4) to form a data packet with the preset fixed data packet size is increased by "t" ms. The horizontal scale in FIG. 4 is time and the M_PDU Packet Zone 408c in data packet 414 is actually the same size or has the same number of bits (7072 bits) as the M_PDU Packet Zone 408a in data packet 402. The time period or time window to form the data packet is increased by slowing the output clock rate or frequency of the telemetry box 312 in FIG. 3. The increased time period defines a new time window that allows additional data 416 to be received for forming a data packet with the preset fixed data packet size. FIG. 3 illustrates the output clock rate 326 or frequency of the telemetry box 312 varying based on the amount of bits being received from the data sources 304a-304n.

As an example, a data rate from an avionics box 308a is assumed to be 5 Megabits per second (Mbps). There are about 100,000 bits per 20 ms window. After adding overhead (TF Header and M_PDU Header) the filled data is about 6.048+03 bits. There will be 15 packets with a total of 122, 912 bits. This implies that out of 122,912 bits in the M_PDU packets, about 6k bits are used for fill data with an idle pattern in order to provide enough bits for an entire packet per 20 ms window. By dynamically, autonomously adjusting or changing the clock output of the telemetry box 312 the number of fill data may be minimized or eliminated. The detection and clock adjustment module 320 or algorithm may determine a new clock rate or frequency based on the data rate of the incoming data. For the present example, a new time window may be determined according to the following equation:

$$\text{New Time Window} = \frac{\text{packet length} \times 0.02}{\text{data in 20 ms}}$$

Accordingly, a new time window to form a packet with the preset fixed data packet size may be a function of the incoming length of the plurality of data (data packet length in bits) divided by the preset fixed data packet size (in bits) for the normal time period for forming the packet (20 ms in the example). The new time window or increased time period is provided by dynamically, autonomously decreasing the clock rate or frequency for formatting the data packets.

Figure 5:
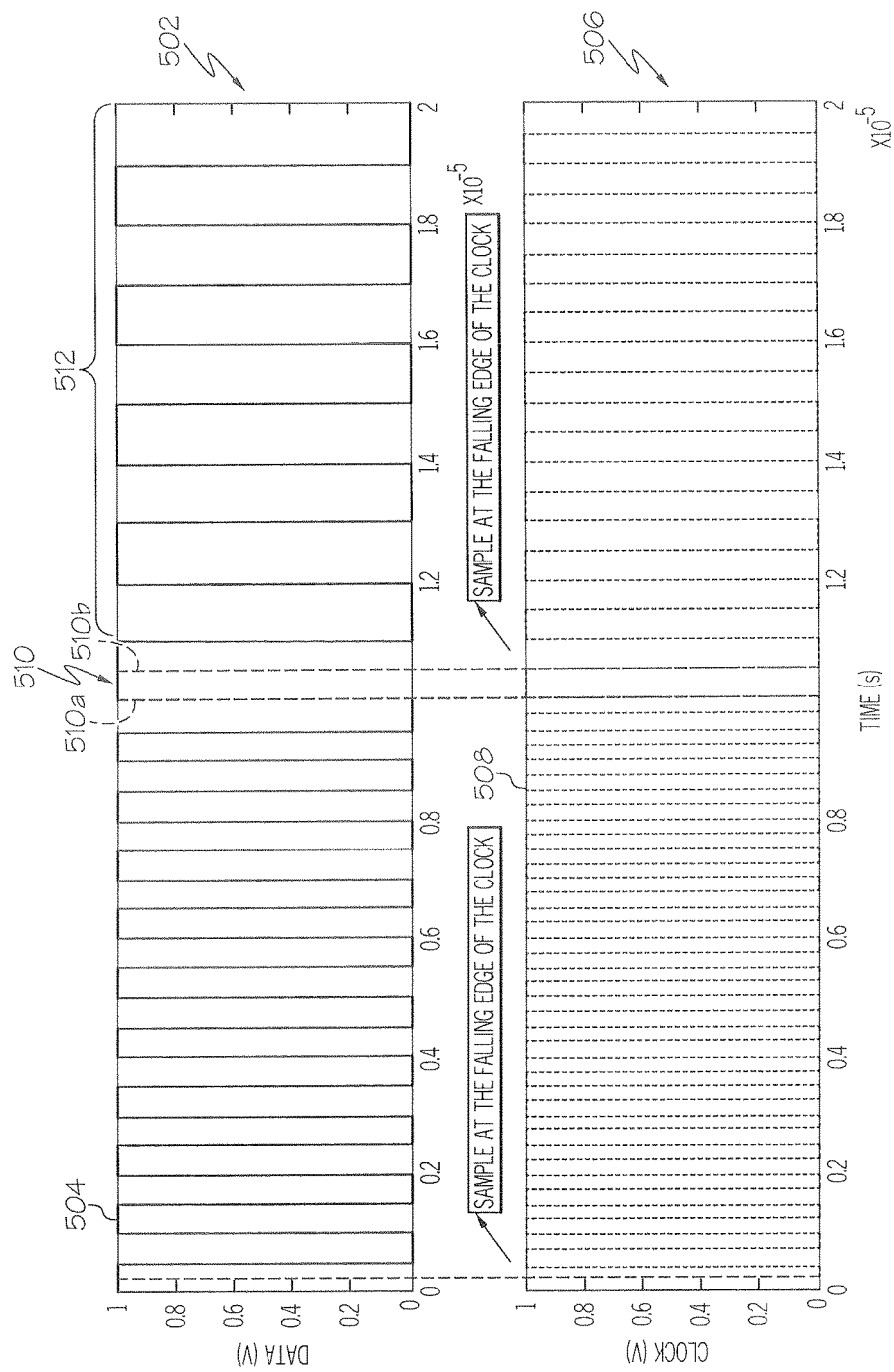
FIG. 5 is an illustration of exemplary data and auto-adaptive clock pulses for sampling the data in accordance with an embodiment of the present disclosure.

FIG. 5 is an illustration of exemplary data and autoadaptive clock pulses for sampling the data in accordance with an embodiment of the present disclosure. The graph or plot 502 is an example of data 504 being received by the telemetry box 312 from the data sources 304a-304n in FIG. 3. The graph or plot 506 is an example of clock pulses 508 generated by the telemetry box 312 for sampling the data 504. In the example, a fixed pattern is used and the data 504 is sampled at a falling edge of the clock pulses 508. As previously described, if there is not enough data 504 to be formatted into a data packet with the preset fixed data packet size, the telemetry box 312 slows its output clock rate or frequency to receive additional data from the data sources 304a-304n to be added to the data packet. This is illustrated to the right of a transition region 510 illustrated by broken lines 510a and 510b. Both the data 504 and the clock pulses 508 have a different (slower) rate in the region 512 after the transition region 510 which allows the data 504 to be sampled at the falling edge of the clock pulses 508 without errors. As previously discussed, the slower clock rate or frequency allows more actual data to be added in each data packet to minimize or eliminate any fill data to complete the preset fixed data packet size.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the invention to the specific embodiments described herein.

What is claimed is:

1. A method for optimizing data communications, comprising:

receiving, by a processing device, a plurality of data;
comparing, by the processing device, a size of the plurality of data to a preset fixed data packet size;
transmitting, by the processing device, the plurality of data within the preset fixed data packet size in response to the size of the plurality of data corresponding to the preset fixed data packet size;
dynamically, autonomously adjusting, by the processing device, a clock frequency for formatting data packets to format one or more data packets that accommodate the size of the plurality of data with minimal fill data in response to the size of the plurality of data being different from the preset fixed data packet size; and
formatting, by the processing device, the one or more data packets in response to dynamically, autonomously adjusting the clock frequency.

2. The method of claim 1, wherein transmitting the plurality of data within the preset fixed data packet size in response to the size of the plurality of data corresponding to the preset fixed data packet size comprises the size of the plurality of data being greater than a predefined threshold value and less than the preset fixed data packet size.

3. The method of claim 1, wherein dynamically, autonomously adjusting the clock frequency for formatting data packets comprises decreasing the clock frequency from a standard clock frequency for the preset fixed data packet size in response to the size of the plurality of data being less than the preset fixed data packet size, a decreased clock frequency allowing additional received data to be added with the plurality of data to provide the preset fixed data packet size.

4. The method of claim 1, wherein dynamically, autonomously adjusting the clock frequency for formatting data packets comprises decreasing the clock frequency from a standard clock frequency for the preset fixed data packet size in response to the size of the plurality of data being less than a predefined threshold value within the preset fixed data packet size, a decreased clock frequency allowing additional received data to be added with the plurality of data until the predefined threshold value is reached or exceeded.

5. The method of claim 1, wherein dynamically, autonomously adjusting the clock frequency for formatting data packets comprises dynamically, autonomously adjusting the clock frequency from a standard clock frequency for formatting the preset fixed data packet size that provides for formatting and transmitting a plurality of preset fixed data packets with only one of the plurality of preset fixed data packets containing a minimal amount of fill data in response to the plurality of data being greater than the preset fixed data packet size.

6. The method of claim 1, wherein comparing the size of the plurality of data to the preset fixed data packet size comprises determining a number of bits received in the plurality of data.

7. The method of claim 1, wherein formatting the one or more data packets comprises formatting the one or more data packets that accommodate the size of the plurality of data with the minimal fill data.

8. A method for optimizing data communications, comprising:
receiving, by a processing device, a plurality of data;
determining, by the processing device, whether a size of the plurality of data has reached or exceeded a predefined threshold value below a preset fixed data packet size;
transmitting, by the processing device, the plurality of data formatted according to the preset fixed data packet size in response to the size of the plurality of data reaching or exceeding the predefined threshold value;
dynamically, autonomously adjusting, by the processing device, a clock frequency to receive additional data in response to the plurality of data being less than the predefined threshold value;
receiving, by the processing device, additional data until the plurality of data and received additional data reach or exceed the predefined threshold value; and
transmitting, by the processing device, the plurality of data and the received additional data formatted in the preset fixed data packet size in response to the plurality of data and the received additional data reaching or exceeding the predefined threshold value.

9. The method of claim 8, wherein determining whether the plurality of data has reached a predefined threshold value comprises:
counting a number of bits of data being received; and
comparing the number of bits of data received to the predefined threshold value.

10. The method of claim 8, further comprising formatting the plurality of data and the received additional data in the fixed data packet size with a minimal amount of fill data in response to the plurality of data and the received additional data reaching or exceeding the predefined threshold value.

11. A system for optimizing data communications, comprising:
a processing device;
an auto-adaptive digital clock system operating on the processing device, the auto-adaptive digital clock system being configured to perform a set of functions comprising:
receiving a plurality of data;
comparing a size of the plurality of data to a preset fixed data packet size;
transmitting the plurality of data within the preset fixed data packet size in response to the size of the plurality of data corresponding to the preset fixed data packet size;
dynamically, autonomously adjusting a clock frequency for formatting data packets to format one or more data packets that accommodate the size of the plurality of data with minimal fill data in response to the size of the plurality of data being different from the preset fixed data packet size; and
formatting the one or more data packets in response to dynamically, autonomously adjusting the clock frequency.

12. The system of claim 11, wherein transmitting the plurality of data within the preset fixed data packet size in response to the size of the plurality of data corresponding to the preset fixed data packet size comprises transmitting the plurality of data within the preset fixed data packet size in response to the size of the plurality of data being greater than a predefined threshold value and less than the preset fixed data packet size.

13. The system of claim 11, wherein dynamically, autonomously adjusting the clock frequency for formatting data packets comprises decreasing the clock frequency from a standard clock frequency for the preset fixed data packet size in response to the size of the plurality of data being less than the preset fixed data packet size, the decreased clock frequency allowing additional received data to be added with the plurality of data to provide the preset fixed data packet size.

14. The system of claim 11, wherein dynamically, autonomously adjusting the clock frequency for formatting data packets comprises decreasing the clock frequency from a standard clock frequency for the preset fixed data packet size in response to the size of the plurality of data being less than a predefined threshold value within the preset fixed data packet size, the decreased clock frequency allowing additional received data to be added with the plurality of data until the predefined threshold value is reached or exceeded.

15. The system of claim 11, wherein dynamically, autonomously adjusting the clock frequency for formatting data packets comprises dynamically, autonomously adjusting the clock frequency from a standard clock frequency for formatting the preset fixed data packet size that avoids transmitting a plurality of preset fixed data packets with at least one preset fixed data packet containing more than a predetermined amount of fill data in response to the plurality of data being greater than the preset fixed data packet size.

16. The system of claim 11, wherein comparing the size of the plurality of data to the preset fixed data packet size comprises determining a number of bits received in the plurality of data.

17. The system of claim 11, wherein formatting the one or more data packets comprises formatting the one or more data packets that accommodate the size of the plurality of data with the minimal fill data.

18. The system of claim 11, wherein the preset fixed data packet size is a channel access data unit frame.

19. The system of claim 11, wherein the system comprises a telemetry box onboard a spacecraft, the plurality of data is received by the telemetry box from a plurality of data sources.

20. A computer program product for optimizing data communications, the computer program product comprising a computer readable storage medium having program instructions embodied therewith, wherein the computer readable storage medium is not a transitory medium per se, the program instructions being executable by a device to cause the device to perform a method comprising:

receiving a plurality of data;

determining whether the plurality of data has reached a predefined threshold value within a preset fixed data packet size;

transmitting the plurality of data within the preset fixed data packet size in response to the plurality of data reaching or exceeding the predefined threshold value;

dynamically, autonomously adjusting a clock frequency to receive additional data in response to the plurality of data being less than the predefined threshold value;

receiving additional data until the plurality of data and the received additional data reach or exceed the predefined threshold value; and transmitting the plurality of data and the received additional data formatted in the preset fixed data packet size in response to the plurality of data and the received additional data reaching or exceeding the predefined threshold value.

* * * * *